Mar. 3, 1925.
C. O. GUERNSEY
DRIVE FOR AUXILIARY APPARATUS
Filed Jan. 22, 1923
1,528,373
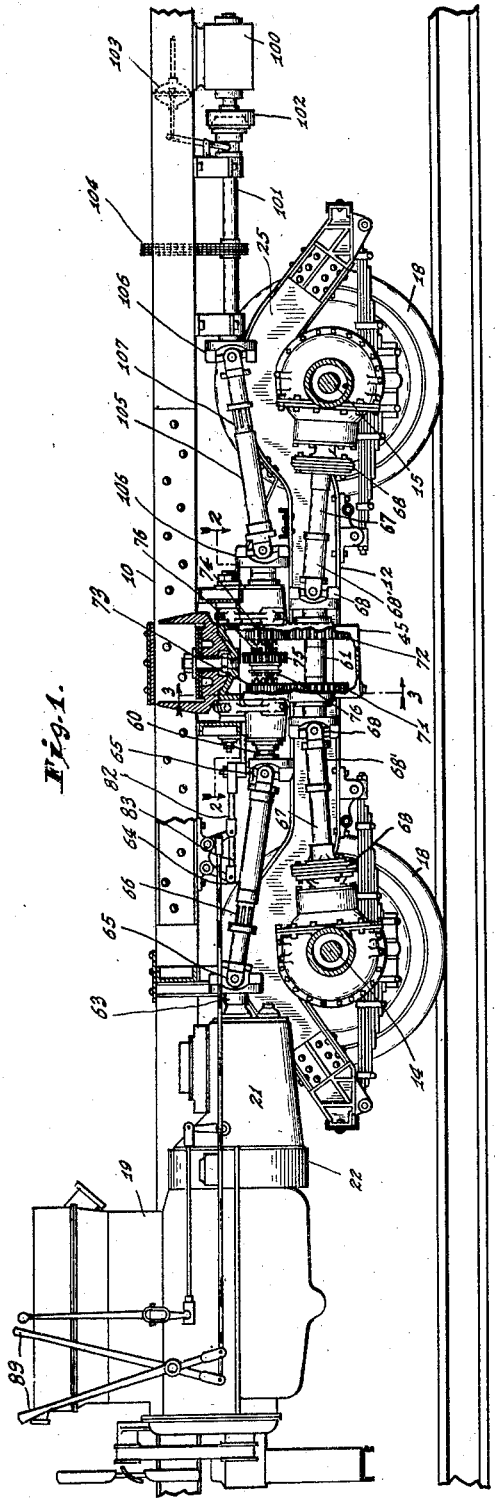
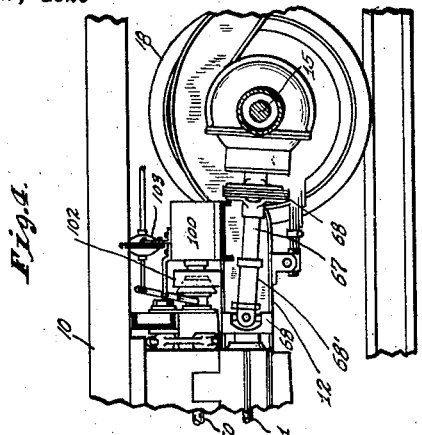
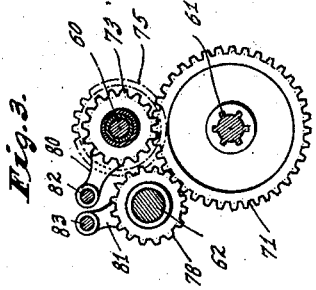
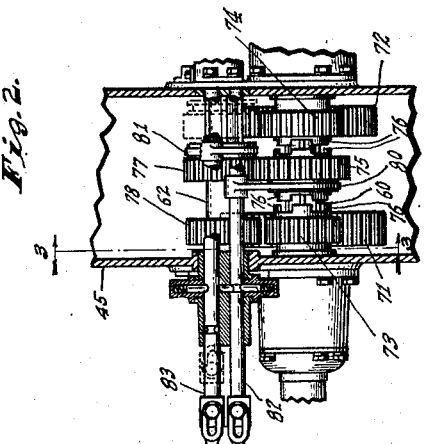
INVENTOR.
CHARLES O. GUERNSEY,
BY
*G. B. Schley.*
ATTORNEY.

Patented Mar. 3, 1925.

1,528,373

UNITED STATES PATENT OFFICE.

CHARLES O. GUERNSEY, OF WABASH, INDIANA.

DRIVE FOR AUXILIARY APPARATUS.

Application filed January 22, 1923. Serial No. 614,272.

*To all whom it may concern:*

Be it known that I, CHARLES O. GUERNSEY, a citizen of the United States, residing at Wabash, in the county of Wabash and State of Indiana, have invented a new and useful Drive for Auxiliary Apparatus, of which the following is a specification.

It is the object of my present invention to provide an alternative driving arrangement for air compressors or other auxiliary apparatus on a motor-driven vehicle, and particularly on a railway motor coach driven by an internal combustion engine, whereby the air compressor or other auxiliary apparatus may be driven either by the driving motor, with the car in motion or not as desired, or by the momentum of the car when the motor is not driving it and if desired is disconnected from the driving wheels. More especially, it is my object to provide such a drive for an air compressor or other auxiliary apparatus in connection with the driving apparatus shown in my co-pending application Serial No. 574,886, filed July 14, 1922, for an improvement in railway motor coaches.

In carrying out my present invention, in its preferred form, I mount the driving motor on the coach frame, which is supported by one or more pivotal trucks, and on one of these trucks provide an intermediate shaft which is driven from the motor through suitable disconnectible driving mechanism, embodying the necessary universal joints and extension joints and preferably including a change-speed device; and from this intermediate shaft on the truck I provide a drive to the driving wheels of the truck, by a disconnectible driving connection preferably including a change-speed or reversing mechanism, or both, so that the intermediate shaft on the truck may be connected either to the driving motor alone or to the driving wheels alone, or to both; and from this intermediate shaft on the truck I provide a driving connection to the air compressor or other auxiliary apparatus, which may be mounted either on the truck or on the coach frame, with suitable universal joints and extension joints in the driving connection in the latter case, and which may be controlled in any suitable manner, as by a clutch controlled by the air pressure in the storage tank.

The accompanying drawing illustrates my invention: Fig. 1 is a fragmentary longitudinal central vertical section through the front end of the coach frame and the front truck, with a number of parts in elevation, showing a driving transmission embodying my invention; Fig. 2 is a fragmentary horizontal section through the transmission gearing on the truck, being taken substantially on the line 2—2 of Fig. 1; Fig. 3 is a vertical section substantially on the lines 3—3 of Figs. 1 and 2; and Fig. 4 is a fragmentary side elevation of a modification in which the air compressor is mounted on the truck, instead of being mounted on the coach-frame as in Fig. 1.

The railway coach has a coach frame 10, for supporting any suitable superstructure. This coach frame 10 is supported on suitable pivotal trucks, of which only the front truck 12 is shown, as so far as my present invention is concerned the rear truck may be anything desired. The front truck 12 is provided with a plurality of axles 14 and 15, each of which is provided at each end with a track-engaging driving wheel 18. The two axles 14 and 15 of the front truck 12 are driven by a motor 19, preferably an internal combustion engine, mounted on the front end of the frame 10, and behind the engine 19 is a multi-speed transmission mechanism 21. The engine 19 and the transmission mechanism 21 may be of any desired type, with any suitable clutch 22 between them, and my present invention is not concerned with their details. For the transmission mechanism 21, I find it sufficient to use one which has the usual neutral or open position, and provides a plurality of speeds, four for instance, in one direction, with no reverse, the reverse mechanism being provided on the front truck. The front truck has an auxiliary transmission, in the drive train between the main transmission 21 and the two driving axles 14 and 15. The auxiliary transmission shown provides two speeds forward and one backward, and any of these can be used for any of the speeds provided for the main transmission 21. In addition, the auxiliary transmission of the front truck has also a neutral or open position, for disconnecting the drive regardless of the position of the main transmission 21 or of the clutch 22.

This auxiliary transmission in the front truck 12, as shown, comprises three parallel shafts extending longitudinally of the front truck, and comprises an incoming-power shaft 60, an outgoing-power shaft 61, and a reverse shaft 62, all mounted in suitable bearings in the truck bolster 45. The shaft 60 is conveniently mounted directly above the shaft 61, while the reverse shaft 62 is off to one side. The forward end of said incoming-power shaft 60 is connected to the outgoing-power shaft 63 of the main transmission 21 by a propeller shaft 64, provided with two universal joints 65 and with a slip or extension joint 66, so that it may vary in both length and angle as conditions require. Each end of the outgoing-power shaft 61 of the auxiliary transmission is connected to the adjacent axle 14 or 15 by a propeller shaft 67, also provided with two universal joints 68, of which at least one in each propeller shaft 67 is conveniently of the flexible-disk type, the one nearest the associated axle being so shown, to allow for variations in effective length of that propeller shaft; although even then I may provide the slip joint 68' in the construction of the propeller shaft. The far end-portion of each propeller shaft 67 beyond the end of the flexible-disk universal-joint is suitably mounted, and suitably connected to the associated axle 14 or 15, in a manner which has nothing to do with my present invention and which is not illustrated here in detail.

In the auxiliary transmission on the driving truck, two gears 71 and 72 of different size are fixed on the outgoing-power shaft 61, and mesh respectively with pinions 73 and 74 of inversely different size loosely mounted on the incoming-power shaft 60. Between the two pinions 73 and 74, a sliding gear 75 is splined on the incoming-power shaft 60. Adjacent faces of the pinion 73 and 74 and the sliding gear 75 are provided with clutch teeth 76, so that by sliding the gear 75 to one end or the other of its axial movement on the shaft 60 either pinion 73 or 74 may be locked to said shaft by the intermeshing of the associated clutch teeth 76. When either set of clutch teeth 76 is intermeshed, and its associated pinion 73 or 74 is thereby locked, there is a gearing connection between the shafts 60 and 61, but this gearing connection is of different ratio for the two sets of gearing 71—73 and 72—74, according to the sizes chosen for the respective pinion gears. Both of these gearings are constant-mesh gearings, and the only drive from the shaft 60 to the shaft 61 is through gearing. The two gearings 71—73 and 72—74 provide the two forward speeds of the auxiliary transmission. The sliding gear 75 has an intermediate open position in which both sets of clutch teeth 76 are demeshed. When the gear 75 is in this intermediate position, a sliding gear 77 on the reverse shaft 62 may be slid along such reverse shaft into mesh with it. This reverse shaft 62 also carries a gear 78 in constant mesh with one of the gears 71 and 72—the gear 71 as shown. Thus the intermeshing of the gears 75—77 produces the reverse drive of the shaft 61, from the shaft 60 through the gears 75, 77, 78, and 71 and the reverse shaft 62. These gearings provide not only a variable and reversible connection between the outgoing power shaft 61 and the incoming-power shaft 60 of the auxiliary transmission, but also provides for the disconnection of said two shafts 60 and 61, so that either may rotate without any rotation of the other. The incoming-power shaft 60 is an intermediate shaft between the engine 19 and the driving wheels 18, and may be connected to or disconnected from either at will.

The gears 75 and 77 are shifted by yokes 80 and 81, fixed on two shift-rods 82 and 83, respectively. These two shift rods are mounted in the truck bolster 45, and are suitably connected, by mechanism fully described in my aforesaid co-pending application, to the operator's gear-shift levers 89.

All the mechanism so far described is the same as that described in my aforesaid co-pending application, and allows the intermediate shaft 60 to be connected either to the engine 19 or to the outgoing power shaft 61 and driving wheels 18, or to be disconnected from either or both, as determined by the manipulation of the gear-shift levers 89 and by the shifting of the main transmission 21 and the operation of the clutch 22. In other words, there is one disconnectible driving connection between the engine 19 and the shaft 60, and another between the shaft 60 and the driving wheels 18. By reason of this, I make use of the shaft 60, which is an intermediate shaft, for driving an air compressor and any other auxiliary mechanism which may be desired. In the arrangement shown in Fig. 1, I mount the air compressor 100 on the coach-frame 10 and provide between it and its driving shaft 101, if desired, a releasable clutch 102, which may be controlled by a fluid-pressure device 103 responsive to the accumulated pressure in the air-storage tank (not shown). The shaft 101 may also be used as a source of power for any other auxiliary apparatus, driven from it in any suitable manner, as by a driving chain 104. When the shaft 101 and the air compressor 100 are mounted on the coach frame 10, as shown in Fig. 1, the forward end of the shaft 101 is connected to the rear end of the incoming-power shaft 60 of the auxiliary transmission on the truck by a propeller shaft 105, provided at its ends with universal joints 106, and at an intermediate point with an extension joint 107, similar to those on the propeller shaft 64. However, if the air compressor 100 is mounted on the truck frame 12, as illustrated in Fig. 4, the propeller shaft 105 with its universal and slip joints may be omitted, because then the air compressor partakes of the movement of the truck; in which case the clutch 102 is provided directly between the rear end of the shaft 60 and the shaft of the air compressor 100.

With either mounting of the air compressor, it is driven from the intermediate shaft 60, for such shaft is intermediate between the driving motor 19 and the driving wheels 18, and may be driven whenever such shaft 60 is in operation, whether or not the driving motor 19 or the driving wheels 18 are also in operation. In other words, because there is a disconnectible connection between the intermediate shaft 60 and the driving motor 19 and also one between such intermediate shaft and the driving wheels 18, such shaft 60 may be driven not only when it is acting as part of the transmission mechanism from the driving motor to the driving wheels, but also when the driving motor is operated and the driving wheels are disconnected from such shaft 60, and when the car is running under momentum so that its driving wheels 18 drive the shaft 60, although the motor 19 at that time may be disconnected from such shaft 60. In any of these cases, the air compressor may be started and stopped as the air requirements demand, under the control of the air-pressure-responsive device 103. This drive of the air-compressor 100, and of other auxiliary mechanism if desired, from the intermediate shaft 60, which is carried by and partakes of the movements of the truck, is obtained for either mounting of such compressor and auxiliary mechanism, whether on the coach frame or on the truck, regardless of the movements of the truck with relation to the coach frame.

I claim as my invention:—

1. In combination, a coach frame, a supporting truck having driving wheels, said coach frame being mounted on said truck on a vertical axis, a driving motor mounted on the coach frame, an intermediate shaft mounted on the truck out of such vertical axis, an auxiliary driven device connected to said intermediate shaft to be driven therefrom, and two disconnectible power-transmission trains connecting said intermediate shaft to said driving motor and to the driving wheels of the truck respectively.

2. In combination, a coach frame, a supporting truck having driving wheels, a driving motor mounted on the coach frame, an intermediate shaft mounted on the truck and movable relatively to said coach frame, an auxiliary driven device connected to said intermediate shaft to be driven therefrom, and two disconnectible power-transmission trains separably connecting said intermediate shaft to said driving motor and to the driving wheels of the truck respectively.

3. In combination, a coach frame, a supporting truck having driving wheels, a driving motor mounted on the coach frame, an intermediate shaft mounted on the truck and movable relatively to said coach frame, an auxiliary driven device connected to said intermediate shaft to be driven therefrom, and two disconnectible variable-drive power-transmission trains separably connecting said intermediate shaft to said driving motor and to the driving wheels of the truck respectively.

4. In combination, a coach frame, a supporting truck having driving wheels, a driving motor mounted on the coach frame, an intermediate shaft mounted on the truck and movable relatively to said coach frame, an auxiliary driven device mounted on the coach frame and connected to said intermediate shaft to be driven therefrom, and two disconnectible power-transmission trains separably connecting said intermediate shaft to said driving motor and to the driving wheels of the truck respectively.

5. In combination, a coach frame, a supporting truck having driving wheels, said coach frame being mounted on said truck on a vertical axis, a driving motor mounted on the coach frame, an intermediate shaft mounted on the truck out of such vertical axis, an auxiliary driven device mounted on the coach frame and connected to said intermediate shaft to be driven therefrom, and two disconnectible power-transmission trains connecting said intermediate shaft to said driving motor and to the driving wheels of the truck respectively.

6. In combination, a coach frame, a supporting truck having driving wheels, said coach frame being mounted on said truck on a vertical axis, a driving motor mounted on the coach frame, an intermediate shaft mounted on the truck, an auxiliary driven device mounted on the coach frame, three power-transmission trains connecting said intermediate shaft to the driving wheels of the truck and to the driving motor and to the auxiliary driven device respectively, each of the last two of said three power-transmission trains including one or more universal joints and an extension joint.

7. In combination, a coach frame, a supporting truck having driving wheels, said coach frame being mounted on said truck on a vertical axis, a driving motor mounted on the coach frame, an intermediate shaft mounted on the track, an auxiliary driven device mounted on the coach frame, three power-transmission trains connecting said intermediate shaft to the driving wheels of the truck and to the driving motor and to the auxiliary driven device respectively, each of the last two of said three power-transmission trains including one or more universal joints.

8. In combination, a coach frame, a supporting truck having driving wheels, said coach frame being mounted on said truck on a vertical axis, a driving motor mounted on the coach frame, an intermediate shaft mounted on the truck, an auxiliary driven device mounted on the coach frame, three power-transmission trains connecting said intermediate shaft to the driving wheels of the truck and to the driving motor and to the auxiliary driven device respectively, each of the last two of said three power-transmission trains including one or more universal joints and an extension joint, and each of the first two of said three power-transmission trains being disconnectible.

9. In combination, a coach frame, a supporting truck having driving wheels, said coach frame being mounted on said truck on a vertical axis, a driving motor mounted on the coach frame, an intermediate shaft mounted on the truck, an auxiliary driven device mounted on the coach frame, three power-transmission trains connecting said intermediate shaft to the driving wheels of the truck and to the driving motor and to the auxiliary driven device respectively, each of the last two of said three power-transmission trains including one or more universal joints, and each of the first two of said three power-transmission trains being disconnectible.

10. In combination, a coach frame, a supporting truck having driving wheels, said coach frame being mounted on said truck on a vertical axis, a driving motor mounted on the coach frame, an intermediate shaft mounted on the truck out of such vertical axis, an air compressor connected to said intermediate shaft to be driven therefrom, two disconnectible power-transmission trains connecting said intermediate shaft to said driving motor and to the driving wheels of the truck respectively, and an air-pressure-responsive device controlling the driving connection between the intermediate shaft and the air compressor.

11. In combination, a coach frame, a supporting truck having driving wheels, a driving motor mounted on the coach frame, an intermediate shaft mounted on the truck and movable relatively to said coach frame, an air compressor connected to said intermediate shaft to be driven therefrom, two disconnectible power-transmission trains connecting said intermediate shaft to said driving motor and to the driving wheels of the truck respectively, and an air-pressure-responsive device controlling the driving connection between the intermediate shaft and the air compressor.

12. In combination, a coach frame, a supporting truck having driving wheels, said coach frame being mounted on said truck on a vertical axis, a driving motor mounted on the coach frame, an intermediate shaft mounted on the truck, an air compressor mounted on the coach frame, three power-transmission trains connecting said intermediate shaft to the driving wheels of the truck and to the driving motor and to the air compressor respectively, each of the last two of said three power-transmission trains including one or more universal joints, and an air-pressure-responsive-device controlling the driving connection between the intermediate shaft and the air compressor.

13. In a vehicle, the combination of a frame, driving wheels, a driving motor, an intermediate shaft movable in position relatively to the driving motor, an auxiliary driven device drivingly connected to said intermediate shaft and movable in position relatively thereto, and two disconnectible power-transmission trains separably connecting said intermediate shaft to said driving motor and to said driving wheels respectively.

14. In a vehicle, the combination of a frame, driving wheels, a driving motor, an intermediate shaft movable in position relatively to the driving motor, an auxiliary driven device drivingly connected to said intermediate shaft, and two disconnectible power-transmission trains separably connecting said intermediate shaft to said driving motor and to said driving wheels respectively.

In witness whereof, I have hereunto set my hand at Wabash, Indiana, this seventeenth day of January, A. D. one thousand nine hundred and twenty-three.

CHARLES O. GUERNSEY.